United States Patent [19]
Gicca
[11] 3,710,255
[45] Jan. 9, 1973

[54] SATELLITE COMMUNICATION SYSTEM

[75] Inventor: Francis A. Gicca, Bedford, Mass.

[73] Assignee: Raytheon Company, Lexington, Mass.

[22] Filed: March 21, 1969

[21] Appl. No.: 809,175

[52] U.S. Cl. ........................325/4, 179/15 FE, 325/9, 325/14, 343/100 ST
[51] Int. Cl. ................................................G01v 3/16
[58] Field of Search .......325/4, 9, 11, 55; 179/15 BS, 179/15 BA, 15 FE; 343/100 ST; 179/15 S

[56] References Cited

UNITED STATES PATENTS

| | | | |
|---|---|---|---|
| 3,378,845 | 4/1968 | Welber | 343/100 ST |
| 3,045,185 | 7/1962 | Mathwich | 325/9 |
| 2,407,212 | 9/1943 | Tunick | 325/7 |
| 2,505,043 | 4/1950 | Guanella | 325/9 |
| 2,908,760 | 10/1959 | Stachiewicz | 325/5 |
| 3,363,180 | 1/1968 | Geissler | 325/4 |

*Primary Examiner*—Robert L. Richardson
*Assistant Examiner*—Richard P. Lange
*Attorney*—Philip J. McFarland and Joseph D. Pannone

[57] ABSTRACT

An improved communication system using an active transponder to relay microwave signals from any one of a number of transmitting stations to selected groups of receiving stations. In a preferred system the active transponder is installed in a satellite spacecraft and is arranged to convert a number of signals, in closely spaced channels, from the transmitting stations in such a manner that the bandwidth of each one of the relayed signals is increased and retransmitted without suffering from the effects of interchannel modulation.

9 Claims, 6 Drawing Figures

INVENTOR
FRANCIS A. GICCA

INVENTOR
FRANCIS A. GICCA

INVENTOR
FRANCIS A. GICCA

INVENTOR
FRANCIS A. GICCA

SATELLITE COMMUNICATION SYSTEM

BACKGROUND OF THE INVENTION

This invention pertains generally to radio frequency communication systems and particularly to systems of such type in which signals are relayed from one point to another.

In the developing field of communicating between points on the earth's surface via satellite spacecraft, the capacity of the transponding equipment in each such spacecraft is limited by frequency, or bandwidth, and power restrictions. While power restrictions are important, known techniques may be applied to both the earth stations and the satellite equipment to achieve adequate two-way power transmission in all presently used frequency bands. The bandwidth problems of known satellite communications are not, however, so conducive to solution, only a relatively few channels for broad-band signals, such as television signals, being available within each of the two 500 MHz common carrier bands currently allocated for this kind of communication service. As a matter of fact, the only known ways in which the number of separate channels may be increased are to increase the number of satellite spacecraft or to utilize additional bands in the frequency spectrum.

At the present time the 6 GHz band in the frequency spectrum (5.925 – 6.425 GHz) is used for signals from the earth to a commercial communication satellite (called uplink receive) and the 4 GHz band (3.700 – 4.200 GHz) is used for signals from the communication satellite to the earth (called downlink transmit). Military communications satellites principally utilize the 8 GHz band (7.900 – 8.400 GHz) for uplink receive and the 7 GHz band (7.250 – 7.750 GHz) for downlink transmit. If each broad-band channel within each such 500 MHz-wide band is on the order of, say, 36 MHz to 40 MHz it becomes evident that a maximum of 12 broad-band channels may be provided by each such satellite. It follows, as noted hereinbefore, that if increased broad-band capacity is required, it may be obtained by increasing the number of satellites.

Increasing the number of satellites entails the obvious disadvantage of increasing the cost of any system because more satellites are required. In the case of synchronous geo-stationary satellites, a need for multiple satellites requires that earth station antennas be steerable or that multiple fixed antennas be directed at the various satellites in use. This negates a principal advantage of the stationary orbit (relatively fixed earth station antennas) and further increases the cost of any system.

The use of known spot downlink antenna techniques allows a common 500 MHz band to be reused by a satellite in noncontiguous antenna beams, with beam directivity providing the downlink isolation needed.

For example, two narrow beams could be each directed at New York and Los Angeles and the same 3.7 – 4.2 GHz band used in each beam to provide different downlink communication channels to each city. In this example, the two spot beams double the downlink channel capacity of the satellite. Since it may be necessary to uplink access any of these 24 channels from any earth station, this leads to a known requirement of 1,000 MHz of uplink receive bandwidth in the example, and more if additional spot beam reuses of the downlink band are contemplated. Since only 500 MHz is currently available in the 6 GHz commercial uplink band, additional uplink bandwidth has been sought at frequencies above 10 GHz to as high as 30 GHz.

Great complications in the system result from the use of any such microwave frequencies (along with the 6 GHz band for uplink transmission) to obtain the required total bandwidth in an operating system. In the first place, the use of such frequencies would require that each transmitting earth station be adapted to transmit signals on several different and potentially widely spaced frequency bands (if access to all reused downlink channels is to be possible). It follows then that the equipment at each such station would, in the present state of the art, be much more complicated than if transmission on only one frequency band were possible. While complication of the equipment at an earth station may make a system more expensive, it is not infeasible so to do. Because, however, the receiving equipment in the satellite must similarly be more complicated, the use of two frequency bands in the uplink portion of a satellite communication system becomes singularly unattractive.

Even if the penalties of added complications could be accepted it is well known that the use of frequency bands well above X-Band for communications is not desirable. Propagation at such higher frequencies is affected, to a much greater degree than at C-Band, by changes in atmospheric conditions in the line of sight between a transmitting and receiving station. For example, precipitation at a transmitting station on the earth would cause some or all of the power in the uplink to be dissipated before reaching the satellite. Such dissipation could, of course, render the system unreliable or inoperative.

Therefore, it is a primary object of this invention to provide an improved satellite communication system in which a single uplink frequency band can provide the channels needed by several reuses of the bandwidth in the downlink, thus obviating the need for additional uplink frequencies.

Another object of this invention is to provide an improved satellite communication system in which the bandwidth of signals from an earth transmitting station is less than the bandwidth of signals retransmitted from a satellite.

Another object of this invention is to provide an improved satellite communication system in which the number of channels within the frequency band of signals retransmitted from a satellite may be maximized.

Still another object of this invention is to provide an improved satellite communication system to accomplish the foregoing purposes without adding complications to the required equipment.

SUMMARY OF THE INVENTION

These and other objects of this invention are attained generally in a satellite communication system by providing equipment in a satellite for receiving signals in each one of a number of adjacent channels within a frequency band, processing such signals to change the carrier frequency and channel width thereof and finally retransmitting the processed signals in beams which are so directed that mutually interfering channels are spatially separated.

BRIEF DESCRIPTION OF THE DRAWINGS

For a more complete understanding of this invention, reference is now made to the following detailed description of a preferred embodiment and to the drawings, illustrative of such embodiment, in which.

DESCRIPTION OF THE PREFERRED EMBODIMENTS

Figures 1, 1A, 1B:
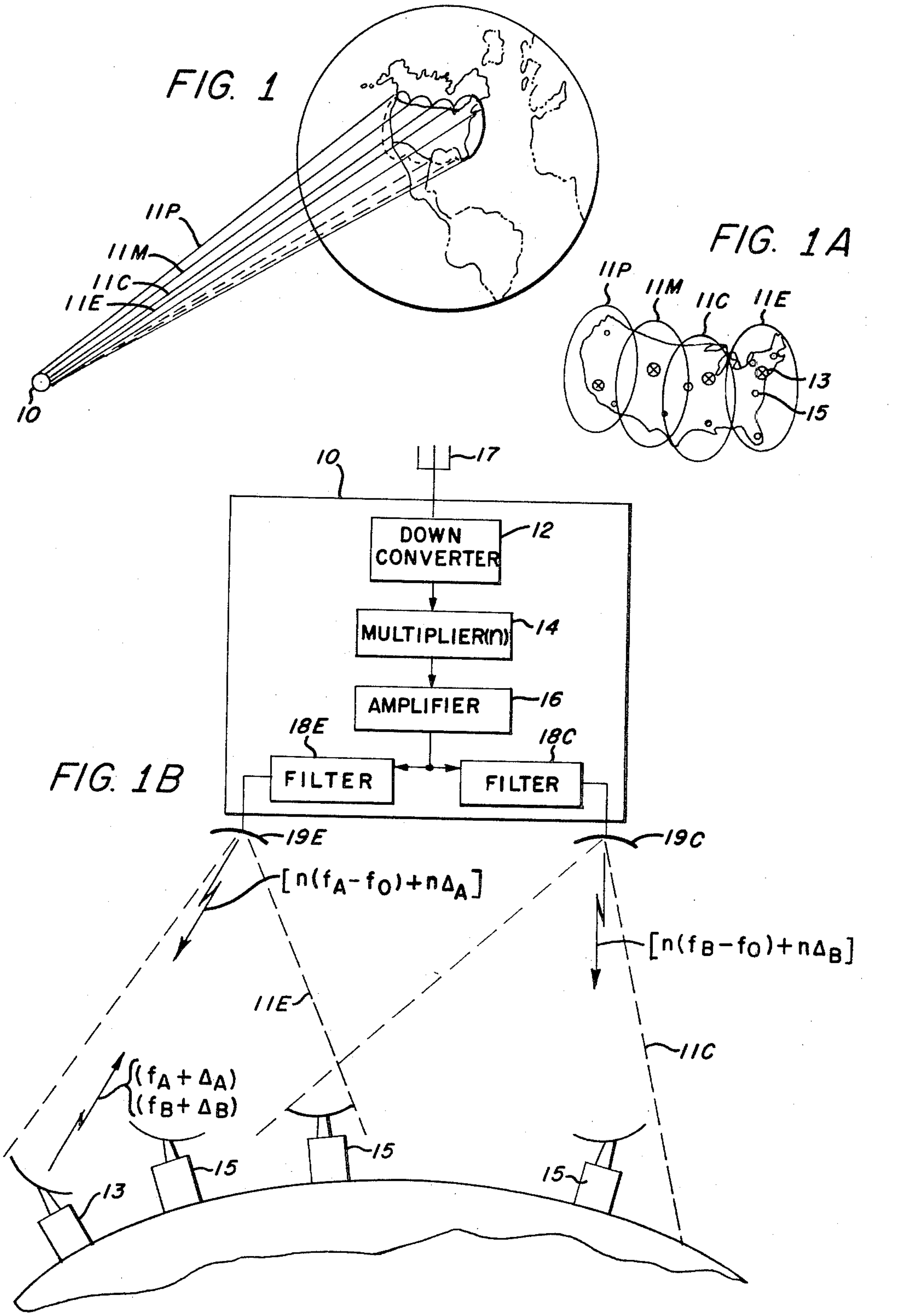
FIG. 1 and FIG. 1A taken together constitute a general sketch of a satellite communication system according to this invention.
FIG. 1B is block diagram of a simplified and idealized satellite communication system according to this invention illustrating the principle of expanding the bandwidth of downlink channels as shown.

Referring now to FIG. 1 and FIG. 1A, it may be seen that the contemplated system includes a satellite spacecraft 10 in a synchronous circular equitorial orbit above the earth (not numbered). The satellite spacecraft 10 propagates four elliptical beams 11E, 11C, 11M and 11P which, taken together, cover the continental limits of the United States as shown. Each of the elliptical beams 11 is, as may more clearly be seen in FIG. 1A, directed to cover a different time zone. The location of exemplary earth stations 13, 15 is also shown in FIG. 1A. Earth stations 13, represented by a cross within a circle, indicate the location of transmit/receive stations while earth stations 15, represented by a circle, indicate the positions of a few of the receiving earth stations which are used in the system. It should be noted here that the various uplink beams from earth stations 13 are not shown in order to avoid undue complication of the drawings. It will be understood, however, that each one of the earth stations 13 includes a directive antenna oriented so as to illuminate the satellite spacecraft 10. In addition, of course, each earth station 13 is interconnected in any desired manner to avoid simultaneous transmissions on the same channel by two or more of the earth stations 13. Earth stations 15 also include a directive antenna, each oriented toward the satellite spacecraft 10 so as to receive energy propagated in the elliptical beams 11. It is noted here in passing that although a particular one of the earth stations 15 may be illuminated by more than one of the elliptical beams 11E, 11C, 11M, 11P, it is impossible for reasons to become clear hereinafter for crosstalk between channels to be detected at any such station.

Before referring specifically to FIG. 1B, it should be recognized that the elementary system therein shown is intended only to illustrate the principles of this invention. The system has, therefore, been simplified and idealized. For example, the system shown in FIG. 1B includes only two uplink channels, designated $(fA + \Delta A)$ and $(fB + \Delta B)$ and two downlink channels, designated $[n(fA - f_o) + n\Delta A]$ and $[n(fB - f_o) + n\Delta B]$, and elements of a working system, as amplifiers, limiters and filters have been omitted.

Referring now to FIG. 1B, the earth station 13 may be seen to beam signals on channel A (wherein $fA$ is the carrier frequency and $\Delta A$ is the maximum deviation of a modulating signal of channel A) and on channel B (wherein $fB$ is the carrier frequency and $\Delta B$ is the maximum deviation of a modulating signal of channel B). The foregoing uplink signals are received by a receiving antenna 17 on the satellite spacecraft 10 and, after processing and separation to be described, retransmitted respectively from transmitting antennas 19E, 19M. Because the transmitting antennas 19E, 19M are shaped and oriented to direct elliptical beams 11E, 11M to different parts of the earth (not numbered) and because the processed uplink channels are separated before being applied to the transmitting antennas 19E, 19M, the site of each earth station 15 determines which of the downlink channels will be received.

It should be noted here that, as shown in FIG. 1B, it is possible that an earth station 15 be so located as to be capable of receiving both downlink channels. Such a capability is of no concern, however, by reason of the fact that the separation between the carrier frequencies of the downlink channels is automatically increased when the frequency of the difference frequency signals is multiplied. Consequently, frequency separation between channels is maintained. As a matter of fact, if N is 2, as in the frequency plan set forth in Table A, it may be seen that the guard band between channels is doubled in the downlink as compared to the uplink.

The processing and separation of signals in the uplink channels is accomplished by passing such signals from the receiving antenna 17 through a down converter 12, a power amplifier 16 and band-pass filters 18E and 18M. Down converter 12, as will be shown in detail hereinafter, includes a local oscillator of frequency $f_o$ and a mixer adapted to heterodyne the signals in the uplink channels with the signal out of the local oscillator. As is known, one of the beat frequency signals resulting from such heterodyning is, for channel A, $[(fA - f_o) + \Delta A]$ and, for channel B, $[(fB - f_o) + \Delta B]$. The just mentioned beat frequency signals, on passing through frequency multiplier 14 are changed to $[n(fA - f_o) + n\Delta A]$ and $[n(fB - f_o) + n\Delta B]$ where $n$ is the multiplication factor of the frequency multiplier 14. Such multiplied beat frequency signals are amplified in the power amplifier 16 and applied to the band-pass filters 18E, 18M. The former filter is arranged to have its center pass frequency at $n(fA - f_o)$ and a pass band of $\pm n\Delta A$. The latter filter is arranged to have its center pass frequency at $n(fB - f_o)$ and a pass band of $\pm n\Delta A$. It follows, therefore, that processed uplink channel A is impressed only on transmitting antenna 19E and processed uplink channel B is impressed only on transmitting antenna 19M.

It will be observed that the multiplication factor, $n$, may conveniently be 2 if it is desired that the bandwidth of the downlink channels be twice the bandwidth of the uplink channels. In such case it is necessary simply to provide that the difference frequencies, $(fA - f_o)$ and $(fB - f_o)$, be equal to one-half the downlink carrier frequencies. Obviously, the proper difference frequencies may be obtained by providing a local oscillator with an output signal of such frequency, $f_o$, as is required to meet such limitations. It should be noted, however, that there is no system requirement that the bandwidth of the downlink signals be the same because ΔA and ΔB are mutually independent.

Figure 2:
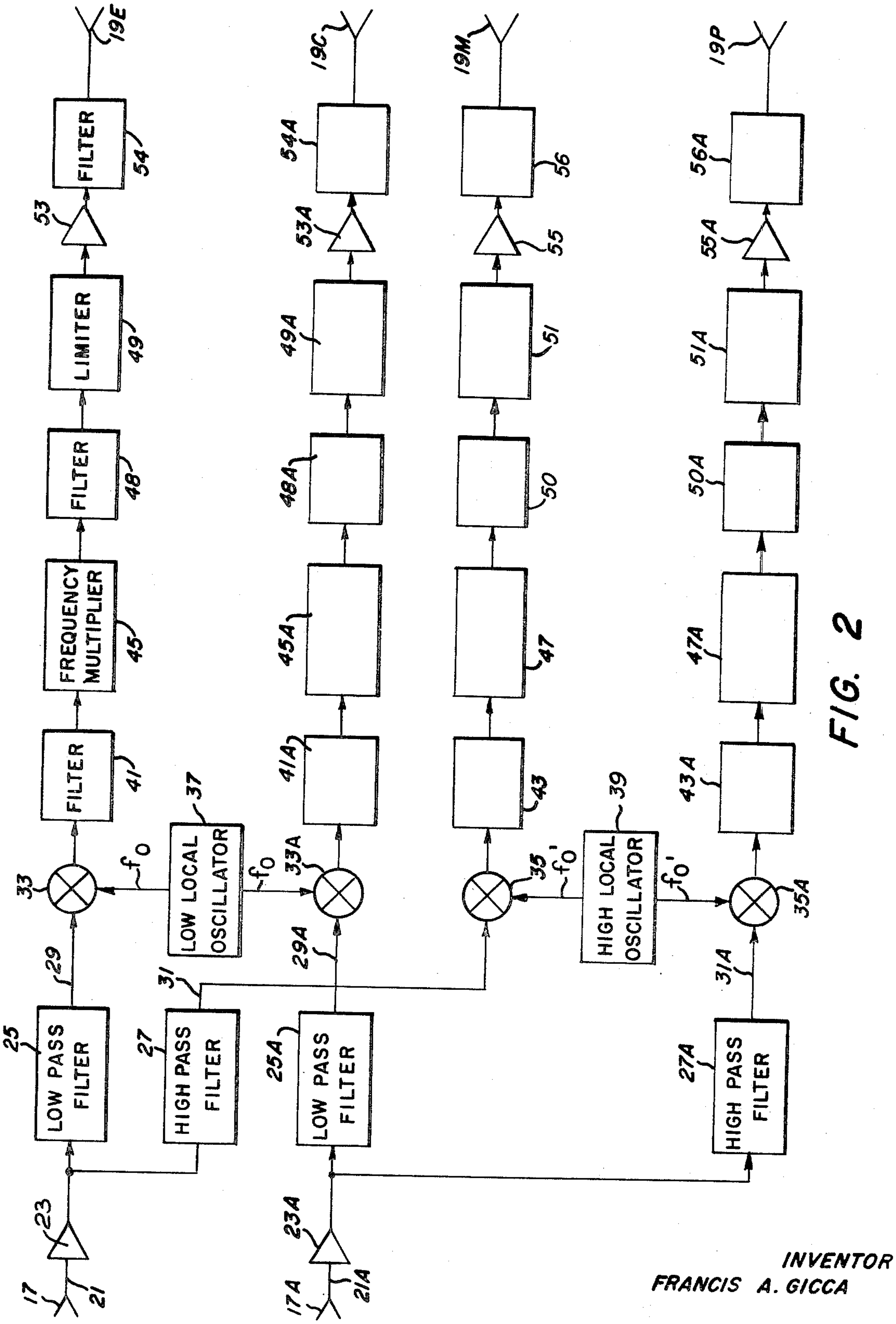
FIG. 2 is a block diagram of the transponder equipment utilized in a satellite spacecraft for multiplexing a relatively high number of channels.

Before referring to FIG. 2 let it be assumed that each of the earth stations 13 are adapted to transmitting on any or all of a plurality, say 20, of channels and that each one of the earth stations 13 is adapted to transmit either vertically polarized or horizontally polarized signals. For convenience of explanation it will be assumed that each one of the earth stations 13 transmits vertically polarized signals in alternate channels and horizontally polarized signals in the remaining channels as indicated in Table A, a typical frequency plan. Let it also be assumed that a frequency modulated carrier is used in both the uplink and downlink portions of the system. As shown in Table A, the maximum deviation (ΔA, ΔB . . . ) in each uplink channel is + or − 10 MHz while the maximum deviation ($n$(ΔA), $n$(ΔB) . . . ) in each downlink channel is + or − 20 MHz. The polarization of the control and telemetry signals from each one of the earth stations 13 is not relevant to this invention.

TABLE A

| Channel | Polarization (Uplink) | Uplink Frequency (MHz) | Local oscillator Frequency (MHz) | Downlink Beam | Downlink Frequency (MHz) |
|---|---|---|---|---|---|
| A | vertical | 5932 ±10 | 4070 | 11E | 3724 ±20 |
| B | horizontal | 5957 ±10 | 4070 | 11C | 3774 ±20 |
| C | vertical | 5982 ±10 | 4707 | 11E | 3824 ±20 |
| D | horizontal | 6007 ±10 | 4070 | 11C | 3874 ±20 |
| E | vertical | 6032 ±10 | 4070 | 11E | 3924 ±20 |
| F | horizontal | 6057 ±10 | 4070 | 11C | 3974 ±20 |
| G | vertical | 6082 ±10 | 4070 | 11E | 4024 ±20 |
| H horizontal | | 6107 ±10 | 4070 | 11C | 4074 ±20 |
| I | vertical | 6132 ±10 | 4070 | 11E | 4124 ±20 |
| J | horizontal | 6157 ±10 | 4070 | 11C | 4174 ±20 |
| K | vertical | 6191 ±10 | 4329 | 11M | 3724 ±20 |
| L | horizontal | 6216 ±10 | 4329 | 11P | 3774 ±20 |
| M | vertical | 6241 ±10 | 4329 | 11M | 3824 ±20 |
| N | horizontal | 6266 ±10 | 4329 | 11P | 3874 ±20 |
| O | vertical | 6291 ±10 | 4329 | 11M | 3924 ±20 |
| P | horizontal | 6316 ±10 | 4329 | 11P | 3974 ±20 |
| Q | vertical | 6341 ±10 | 4329 | 11M | 4024 ±20 |
| R | horizontal | 6366 ±10 | 4329 | 11P | 4074 ±20 |
| S | vertical | 6391 ±10 | 4329 | 11M | 4124 ±20 |
| T | horizontal | 6416 ±10 | 4329 | 11P | 4174 ±20 |
| Control & Telemetry | | 6179 ±5 | | | 4218 ±10 |

Referring now to FIG. 2, the transponder equipment in the satellite spacecraft 10 may be seen to include two receiving antennas 17, 17A and four transmitting antennas 19E, 19C, 19M and 19P between which is interposed circuitry for receiving, separating and amplifying the various signals transmitted from the earth stations 13 for retransmission. The receiving antennas 17, 17A may take any form known in the art provided that one, say receiving antenna 17, be responsive only to vertically polarized signals and the other be responsive only to horizontally polarized signals. The transmitting antennas 19E, 19C, 19M and 19P also may be conventional, each here forming an elliptical beam approximately 5° × 2°. The elliptical beams 11E, 11C, 11M, 11P are oriented so that their major axes are approximately north and south as shown in FIG. 1A.

Uplink signals received at the receiving antennas 17, 17A are separated thereby in accordance with their polarization to pass through a transmission line 21 to a radio frequency amplifier 23 or through a transmission line 21A to a radio frequency amplifier 23A. Radio frequency amplifier 23 and radio frequency amplifier 23A may be conventional low noise amplifiers for frequencies within the uplink frequency bandwidth. The amplified signals from radio frequency amplifier 23 are fed into a low band-pass filter 25 and a high band-pass filter 27. These latter two elements also may be conventional in construction, differing only in that the low band-pass filter 25 passes signals in the lower half of the uplink frequency band and high band-pass filter 27 passes only frequencies in the higher half of the uplink frequency band. The signal out of the radio frequency amplifier 23A similarly is passed to a low band-pass filter 25A and a high band-pass filter 27A. It will be recognized here that the overall effect of the low and high band-pass filters is to separate the signal paths of the various signals out of the radio frequency amplifiers 23, 23A. That is, uplink signals on carrier frequencies corresponding to channels A, C, E, G and I appear on transmission line 29; uplink signals on carrier frequencies corresponding to channels K, M, O, Q and S appear on transmission line 31; uplink signals on carrier frequencies corresponding to channels B, D, F, H and J appear on transmission line 29A and uplink signals on carrier frequencies corresponding to channels L, N, P, R and T appear on transmission line 21A. Transmission line 29 is connected to an input terminal of a mixer 33, transmission line 29A is connected to an input terminal of a mixer 33A, transmission line 31 is connected to an input terminal of a mixer 35 and transmission line 31A is connected to an input of a mixer 35A. The second input of the mixer 33 and the mixer 33A are connected to an output terminal of a low local oscillator 37 while a second terminal of the mixer 35 and 35A are connected to an output terminal of a high local oscillator 39. It will be recognized that the output signal from each of the mixers 33, 33A, 35, 35A includes a number of difference frequency signals. It will also be recognized that by maintaining the frequency of the low local oscillator 37 and the frequency of the high local oscillator 39 at fixed values relative one to another the difference frequency signals out of mixer 33 may be identical with those out of mixer 35 and that similar correspondence may be had for the difference frequency signals out of mixer 33A and 35A.

The output signal from each of the mixers 33, 33A, 35, 35A is fed to a band-pass filter 41, 41A, 43, 43A as shown. These elements are conventional in construction to reject all, except a particular one, of the difference frequency signals out of the mixers 33, 33A, 35, 35A. Each of the selected difference frequency signals is, as shown, fed through a multiplier 45, 45A, 47, 47A, a band-pass filter 48, 48A, 50, 50A, a limiter 49, 49A, 51, 51A, a power amplifier 53, 53A, 55, 55A and band-pass filter 54, 54A, 56, 56A to the transmitting antennas 19E, 19C, 19M, 19P.

Figure 3:
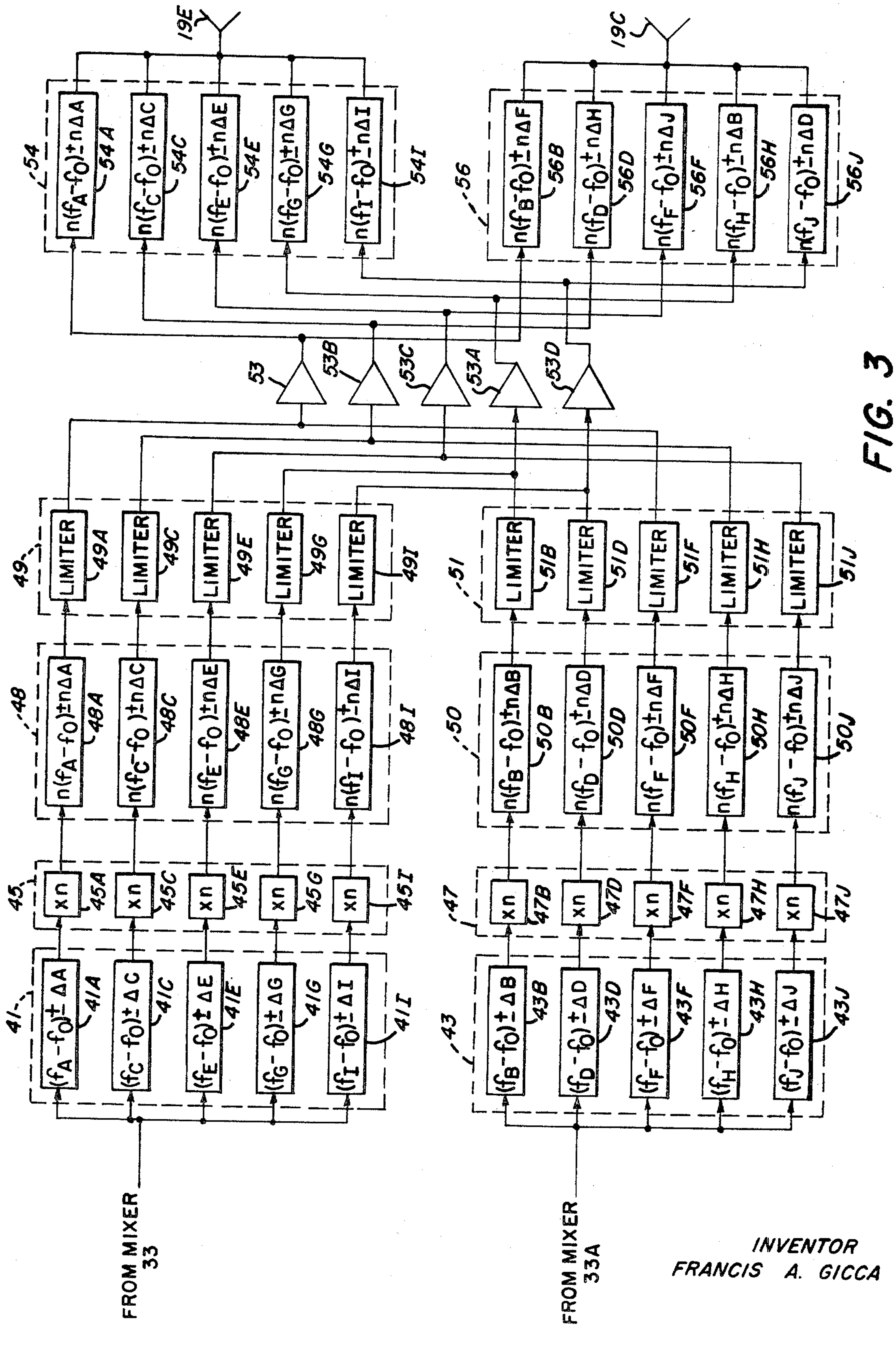
FIG. 3 is a detailed block diagram of selected portions of the block diagram shown in FIG. 2 illustrating the manner in which downlink bandwidth expansion is preferably effected.

Referring now to FIG. 3, the details of two of the signal paths between the mixer 33, 33A and the transmitting antenna 19E, 19C are shown, it being understood that the details of the other two like signal paths of FIG. 2 are similar. Thus, sideband filters 41, 43 each consist of five band-pass filters marked, respectively, [($f$A–$f_o$) + ΔA] through [($f$I–$f_o$) + ΔI] and $[(fB-f_0)+\Delta B]$ through $[(fJ-f_0)+\Delta J]$ and labeled 41A, 41C, 41E, 41G, 41I, 43B, 43D, 43F, 43H and 43J. The letter after each callout numeral is here intended to indicate (except when used with an amplifier) the uplink channel in Table A with which the element is associated. That is, band-pass filter 41A, for example, is associated with uplink channel A, band-pass filter 41C is associated with uplink channel C, and so on. The center frequency of each band-pass filter is indicated by the left-hand term and the bandwidth of each band-pass filter is indicated by the right-hand term in each block. For example, the center frequency of band-pass filter 41A is $(fA-f_0)$ and the band-pass thereof is $\pm \Delta A$. The band-pass filters 41A, 41C, . . . 43J each act to pass a signal of desired frequency and a rejection filter for all other signals out of the mixers 33, 33A of FIG. 2. In other words, the band-pass filters 41A through 43J each operate to select a single one of the various sum and difference signals produced by the mixer 33, 33A. The signal out of each band-pass filter 41A, 41C, . . . 41S is fed to a corresponding frequency multiplier 45A, 45C, 45E, 45G, 45I, 47K, 47M, 47O, 47Q, 47S wherein the center frequency and any modulation frequency is multiplied. While any of a number of known types of frequency multipliers may be used, it is convenient here to use a Shockley diode in a waveguide.

The signal out of each frequency multiplier 45A through 47J is fed to a corresponding band-pass filter 48A, 48C, 48E, 48G, 48I, 50B, 50D, 50F, 50H and 50J. These filters are similar to the band-pass filters 41A through 43J, except that: (a), the center pass frequency of each of the former filters is $n$ times the center pass frequency of the corresponding one of the latter, where $n$ equals the multiplication factor of the frequency multipliers 45A through 47J; and, (b), the band-pass of each of the former filters is similarly changed. In passing, it is here noted that the carrier frequencies of the signals out of the band-pass filters 48A through 50J remain interlaced when, as here, the multiplication factor of the frequency multipliers is constant.

The signals out of the band-pass filters 48A through 50J are fed through conventional limiters 49A, 49C, 49E, 49G, 49I, 51B, 51D, 51F, 51H, 51J which eliminate any amplitude modulation which may be impressed on the various signals. After passing through the limiters 49A through 51J, pairs of the signals which have the greatest convenient frequency separation are fed to the power amplifiers 53, 53A, 53B, 53C, 53D as shown. Thus, for example, the signal out of limiter 49A and out of limiter 51F are fed to power amplifier 53. Such a connection, obviously, permits a single power amplifier, such as the one designated by the reference number 53, to be used to amplify two downlink channel signals, as $[n(fA-f_0) \pm n\Delta A]$ and $[n(fF-(_0) \pm n\Delta F]$, without cross-modulation. After amplification in the power amplifiers 53 through 53D, the signals are again filtered as shown in the band-pass filters 54A, 54C, 54E, 54G, 54I, 56F, 56H, 56J, 56B and 56D and fed to the transmitting antennas 19E, 19C.

While the embodiment just described appears to be somewhat complicated, it will be recognized by those skilled in the art that the complications arise primarily because it is necessary to eliminate unwanted sidebands and harmonics generated when elements such as known mixers and multipliers are used. It will be recognized also that a larger or lesser number of channels would correspondingly affect the complexity of the illustrated circuit. In operation, then, the circuitry shown in FIGS. 2 and 3: (a), separates received signals in antennas 17, 17A by reason of the polarization thereof; (b), further separates the received signals in low pass filters 25, 25A and high pass filters 27, 27A; (c), down shifts the carriers of each of the finally separated signals so that the carrier frequency of signals passing through low pass filter 25 is the same as the carrier frequency of signals passing through the high pass filter 35 and similar correspondence in frequency is attained for the carrier frequencies of signals passing through the low pass filter 25A and the high pass filter 27A; separately multiplies each down-shifted carrier and the modulation signal impressed on each; amplifies each multiplied signal; and finally impresses different groups of such amplified signals on separate transmitting antennas.

Figure 4:
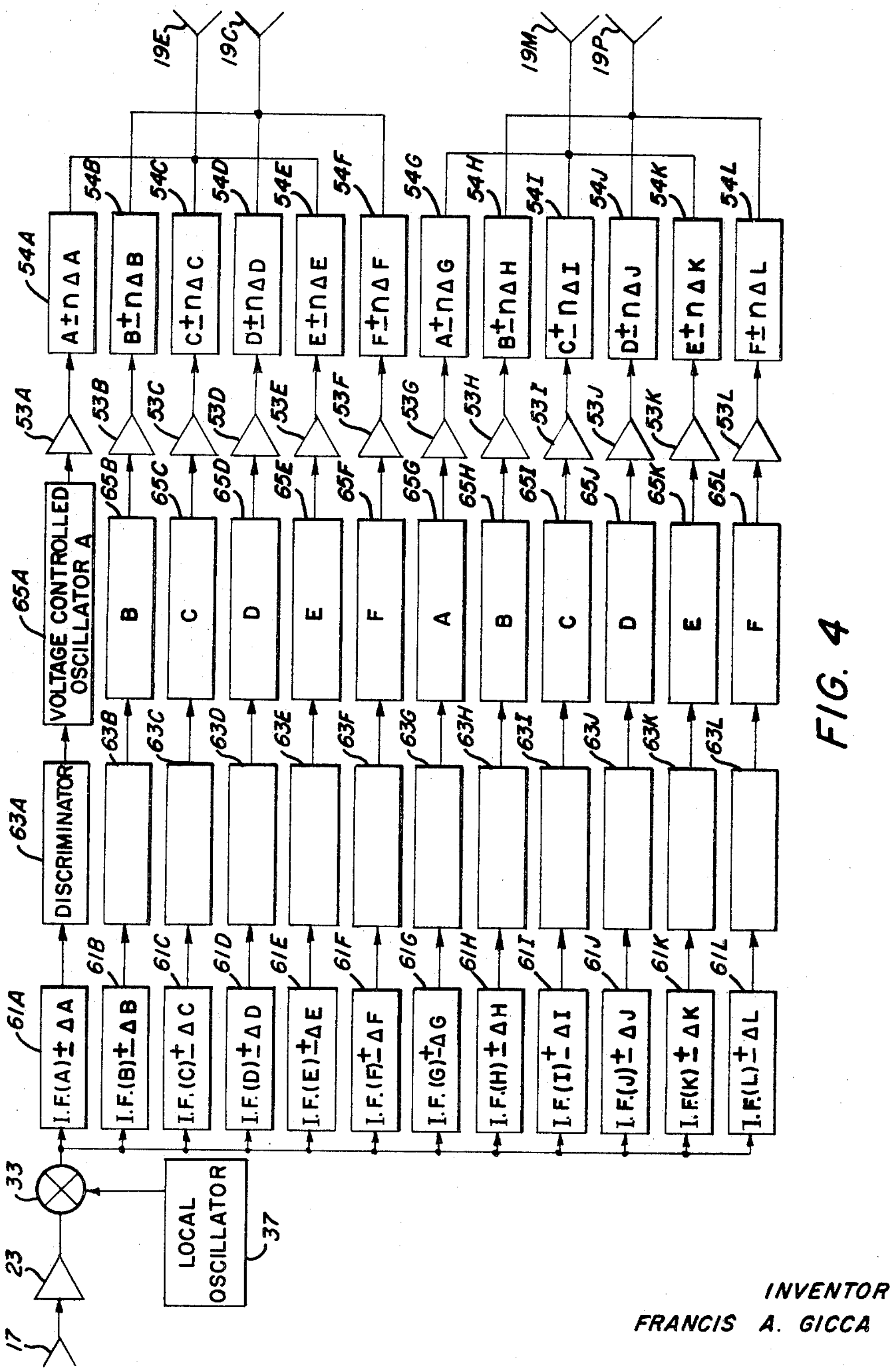
FIG. 4 is a block diagram of an alternative embodiment of this invention.

Referring now to FIG. 4, the alternative embodiment of this invention may be seen to consist of a number of conventional receiving sets arranged in such a way that the modulation signals in each uplink channel may be separately detected and then utilized to modulate a downlink oscillator. The modulation characteristics of each such oscillator and the unmodulated frequency thereof is so chosen that the desired downlink channel carrier frequency and modulation is attained for each channel. Thus, in FIG. 4, uplink signals (not shown) are passed from receiving antenna 17 through radio frequency amplifier 23 to mixer 33. A signal from local oscillator 37 is also applied to mixer 33 to produce a spectrum of intermediate frequency signals which are applied to a number, here twelve, of intermediate frequency amplifiers 61A, 61B, 61C, 61D, 61E, 61F, 61G, 61H, 61I, 61J, 61K, 61L. Each of the just mentioned elements has a center pass frequency related to the center frequency of an uplink channel, as (A), (B), (C), and so on noted and a band-pass of $\Delta A$, $\Delta B$, $\Delta C$ . . . corresponding to the maximum deviation of a signal in each uplink channel. As is known, each one of the intermediate frequency amplifiers may be considered to be a rejection filter for all frequencies outside its pass-band. The output signal from each intermediate frequency amplifier 61A through 61L is fed to a discriminator 63A, 63B, 63C, 63D, 63E, 63F, 63G, 63H, 63I, 63J, 63K, 63L as shown to demodulate the various intermediate frequencies and recover the modulation signals in each channel. Such recovered signals are then fed to a voltage controlled oscillator 65A, 65B, 65C, 65D, 65E, 65F, 65G, 65H, 65I, 65J, 65K, 65L. Each of the just-mentioned oscillators is so arranged that, when unmodulated, its output signal frequency corresponds to the center frequency of a downlink channel as indicated. In this connection it should be noted that in the illustrated example only six such frequencies are used even though there are twelve downlink channels. Cross-modulation between channels having the same center frequency is, as before, eliminated by spatially separating such potentially interfering signals in the transmitting antennas 19E, 19C, 19M, 19P. Each of the voltage controlled oscillators 65A through 65L further is arranged so that the change in frequency of the output signal of each, in response to the signal output of its associated discriminator 63A through 63L, *n* times the deviation in the uplink channel. The output signals from the voltage control oscillators 65A through 65F are fed through power amplifiers 53A, 53B, 53C, 53D, 53E, 53F, 53G, 53H, 53I, 53J, 53K, 53L and band-pass filters 54A, 54B, 54C, 54D, 54E, 54F, 54G, 54H, 54J, 54K, 54L to transmitting antennas 19E, 19C, 19M, 19P as shown.

It will be immediately evident to a person of skill in the art that the concept of this invention may be implemented in different ways than those illustrated and explained hereinbefore and that the concept of this invention also encompasses a method of communicating information via an active transponder. With respect to the latter point it is obvious that the method, which includes the steps of multiplexing a number of communication channels from a transmitter and relaying, after changing the carrier frequency and modulation of the signal in each channel, to spatially separated receivers may be implemented differently from the manner shown herein. For example, the method contemplated could also be used in cable communication systems. It is felt, therefore, that this invention should not be restricted to its disclosed embodiments but rather should be limited only by the spirit and scope of the appended claims.

What is claimed is:

1. A transponder, for use in a multichannel FM communication system to relay simultaneously received transmission having different carrier frequencies from any one of plurality of transmitters to any one of a plurality of receivers, comprising.

a. receiving antenna means for receiving transmission from any one of the transmitters on any channel;

b. first filter means connected to receiving antenna means including a plurality of set of band-pass filters each thereof having a different center pass frequency;

c. heterodyning means consisting of a first and second local oscillator each producing a signal output and a first and second sets of mixing means each mixing means of each set responsive to the signal output of the first and second local oscillator and the carrier frequency signals of the first filter means to produce at least two sets of difference frequency signals having similar carrier frequencies, each one thereof carrying the deviation signal of a corresponding channel;

d. multiplying means operative on each one of the disparate difference frequencies signals to shift the frequency within the band of frequencies acceptable to the receivers and to increase the deviation of each one of the so-changed signals; and e. transmitting antenna means selectively energized and oriented to separate mutually interfering ones of the so-changed signals of the multiplier means and to direct such separated signals to different ones of the receivers.

2. A transponder as in claim 1 having, additionally, second filter means disposed between the heterodyning means and the multiplying means, each such second filter means passing a single one of the difference frequency signals out of the first and the second mixing means.

3. A transponder as in claim 2 wherein the multiplying means includes a separate multiplier for each one of the difference frequency signals, each such multiplier being operative on both the carrier frequency signal and the deviation signal of each one of the difference frequency signals.

4. A transponder as in claim 2 having, additionally, third filter means operative on the output signals of each one of the multiplying means to pass only a single one of the signals out of each one of the multiplying means.

5. A transponder as in claim 4 having, in addition, amplifying means operative on each one of the signals out of the third filter means.

6. A transponder as in claim 5 having, in addition, fourth filter means disposed between the amplifier means and the transmitting antenna means, each such filter means operative on the output signals from the amplifier means to pass only a single one of the output signals to the transmitting antenna means.

7. An improved communication system for transmitting information through a transponder in a synchronous communication satellite, from a transmitter at a ground station to receivers at ground stations in different geographical areas, the transmitter being adapted to impress information to be transmitted as a modulation signal on any selected one of a plurality of different uplink frequency signals within a fixed bandwidth, such system being characterized by:

a. *n* sets of filtering and heterodyning means in the transponder, each set thereof being responsive to uplink frequency signals from the transmitter, within a different one of *n* portions of the fixed bandwidth, for converting the uplink frequency signals to *m* sets of identical intermediate frequency signals;

b. *n* sets of frequency multiplying means in the transponder, each one of such means being responsive to a different one of the *n* sets of intermediate frequency signals, for producing *n* sets of downlink frequency signals, the bandwidth of each one of the latter sets being substantially equal to the fixed bandwidth of the uplink frequency signals; and, c. *n* sets of directional antenna means, each one thereof being responsive to a different one of the *n* sets of downlink frequency signals, for directing the downlink frequency signals in each set thereof toward a different geographical area.

8. An improved communication system as in claim 7 having additionally:

a. a plurality of amplifying means in the transponder, each one of such means being responsive to at least two different downlink frequency signals from different ones of the *n* sets thereof, for amplifying the downlink frequency signals out of each one of the *n* frequency multiplying means; and, b. multiplexing means to separate the amplified downlink frequency signals out of each one of the amplifying means and to direct each one of such separated and amplified downlink frequency signals to its corresponding directional antenna means.

9. An improved communication system as in claim 8 wherein the difference between each one of the different uplink frequency signals and its corresponding intermediate frequency signal is substantially equal to one-half the frequency of the corresponding downlink frequency signal and each one of the *n* frequency multiplying means doubles the frequency of the intermediate frequency signal applied thereto.

* * * * *